United States Patent
Walker

(10) Patent No.: US 6,939,483 B2
(45) Date of Patent: Sep. 6, 2005

(54) BRINE FLUIDS WITH IMPROVED CORROSION PROPERTIES

(75) Inventor: Michael L. Walker, Sugar Land, TX (US)

(73) Assignee: PABU Services, Inc., Wilmington, DE (US)

( * ) Notice: Subject to any disclaimer, the term of this patent is extended or adjusted under 35 U.S.C. 154(b) by 292 days.

(21) Appl. No.: 09/975,797

(22) Filed: Oct. 11, 2001

(65) Prior Publication Data

US 2002/0038863 A1 Apr. 4, 2002

Related U.S. Application Data

(63) Continuation-in-part of application No. 09/514,825, filed on Feb. 28, 2000, now abandoned.

(51) Int. Cl.$^7$ ................................................ C09K 3/00
(52) U.S. Cl. ...................... 252/390; 252/392; 252/394; 507/939; 507/239; 507/241; 507/242; 507/243; 507/244; 507/248
(58) Field of Search ................................ 252/390, 391, 252/392, 394, 387; 507/939, 239, 241, 243, 244, 248

(56) References Cited

U.S. PATENT DOCUMENTS

| | | | | |
|---|---|---|---|---|
| 2,319,668 A | * | 5/1943 | Edmunds | 159/47.1 |
| 3,054,750 A | * | 9/1962 | Jolly | 507/244 |
| 3,770,055 A | * | 11/1973 | Larsen | 166/305.1 |
| 3,872,116 A | | 3/1975 | Gipson | |
| 3,909,200 A | * | 9/1975 | Redmore | 422/16 |
| 4,013,568 A | | 3/1977 | Fischer et al. | |
| 4,101,441 A | * | 7/1978 | Hwa et al. | 252/389.2 |
| 4,499,006 A | | 2/1985 | Valone et al. | |
| 4,728,446 A | * | 3/1988 | Doty et al. | 507/277 |
| 4,784,778 A | * | 11/1988 | Shin | 507/258 |
| 4,784,779 A | * | 11/1988 | Dadgar | 507/266 |
| 4,836,941 A | | 6/1989 | Thomas | |
| 4,867,888 A | | 9/1989 | Valone | |
| 4,900,458 A | | 2/1990 | Schroeder et al. | |
| 4,943,480 A | * | 7/1990 | Itzhak | 428/332 |
| 4,997,583 A | * | 3/1991 | Itzhak | 507/275 |
| 5,300,247 A | * | 4/1994 | Emerich et al. | 252/77 |
| 5,846,450 A | | 12/1998 | Atkinson | |
| 5,891,225 A | | 4/1999 | Mishra et al. | |
| 5,935,487 A | | 8/1999 | Beazley et al. | |
| 5,939,362 A | | 8/1999 | Johnson et al. | |
| 6,620,338 B2 | * | 9/2003 | Fan et al. | 252/180 |
| 6,762,154 B2 | * | 7/2004 | Lungwitz et al. | 507/131 |

FOREIGN PATENT DOCUMENTS

| | | | |
|---|---|---|---|
| CA | 1131002 | | 9/1982 |
| EP | 0 207 713 B1 | | 9/1991 |
| WO | WO 86/04634 A | * | 8/1986 |
| WO | WO 93/19226 | | 9/1993 |

OTHER PUBLICATIONS

Arai, K., "Studies on the Corrosion of Brine", Journal of Food Science & Technology, vol. 7, Mar. 1970, pp. 35–36.
Claims/US Database Abstract of U.S. Pat. No. 2,510,063 issued Jun. 6, 1950.
Claims/US Database Abstract of U.S. Pat. No. 2,920,040 issued Jan. 5, 1960.
Claims/US Database Abstract of U.S. Pat. No. 4,636,256 issued Jan. 13, 1987.
Derwent/WPI Database Abstract, 1988, of JP 63199278 published Aug. 17, 1988.
Claims/US Database Abstract of U.S. Pat. No. 5,128,065 issued Jul. 7, 1992.

* cited by examiner

Primary Examiner—Philip C. Tucker
(74) Attorney, Agent, or Firm—Baker & Daniels

(57) ABSTRACT

It has been discovered that ammonia and amines are useful to increase the pH and corrosion resistance of high density brines, such as zinc bromide brines, without significantly reducing their densities. The ammonia or amine additive is preferably incorporated by contacting the brine with the additive which is in the vapor phase. Optionally, a substituted carboxylic acid, such as hydroxy carboxylic acid, may be used to increase the amount of ammonia or amine that can be included in the high density brine without precipitation of salts.

12 Claims, No Drawings

BRINE FLUIDS WITH IMPROVED CORROSION PROPERTIES

CROSS REFERENCE TO RELATED APPLICATION

This application is a continuation-in-part of U.S. patent application Ser. No. 09/514,825, filed Feb. 28, 2000, now abandoned.

FIELD OF THE INVENTION

The instant invention relates to brine fluids, such as those used in recovering hydrocarbons, and more particularly relates, in one embodiment, to high density brine fluids with improved corrosion resistance.

BACKGROUND OF THE INVENTION

High density brine fluids are known to be applied in situations where control of pressure in a well is needed. Many soluble salts may be used to achieve the desired density of the aqueous solution. The more common salts used include, but are not necessarily limited to, chloride and/or bromide salts of the following cations: sodium, potassium, calcium and zinc. These salts impart density to the aqueous fluid by dissolving in the medium. A high density fluid may be understood as one of greater than about 8.4 pounds/gallon (1.0 kg/l) density, preferably from about 8.4 to about 22.5 lbs/gal. (1.0–2.7 kg/l), most preferably from about 9.0 to about 22.0 lbs/gal. (1.1–2.6 kg/l).

The density of these solutions made by dissolving these salts in water are limited by the molecular weight and the solubility of that salt. Zinc is a preferred cation. Zinc salts are desired as components of high density brines because of their relatively high molecular weight and great solubility in water.

Brines, including zinc-containing brines, have low pH in aqueous solutions inherently. The acid content of these fluids give the brines undesirable characteristics, one of the greatest of which are high corrosion losses that limit the uses and applications of these fluids.

A method and composition that would overcome some of the problems in the conventional brines would be desirable.

SUMMARY OF THE INVENTION

An object of the present invention is to provide a method to raise the pH and thus raise the corrosion resistance of high density brine fluids.

Another object of the present invention is to provide high density brines having an increased pH and improved corrosion resistance through the employment of readily available agents.

In carrying out these and other objects of the invention, there is provided, in one form, a corrosion resistant brine fluid which contains water; a source of water soluble cations where the cations are selected from the group consisting of lithium, sodium, potassium, calcium, zinc, ammonium, cesium, rare earths, and mixtures thereof to form a brine with the water; and an additive selected from the group consisting of ammonia, an amine, a salt thereof, a compound capable of generating ammonia, an amine, and salts thereof, and mixtures thereof where the ammonia, amine or salt thereof is present in an amount effective to raise the pH of and decrease the corrosion of the brine.

DETAILED DESCRIPTION OF THE INVENTION

The addition of an amine or ammonia (or compound capable of generating amine or ammonia) to a high density brine of sufficient salt content, e.g. zinc bromide, in a controlled manner has been discovered to reduce the acidity of the zinc solution.

The invention is expected to be useful for any high density fluid having a density of greater than about 8.4 pounds/gallon (1.0 kg/l), preferably from about 8.4 to about 22.5 lbs/gal (1.0–2.7 kg/l), most preferably from about 9.0 to about 22.0 lbs/gal (1.1–2.6 kg/l) and which has low pH, i.e., which is less than neutral. In one non-limiting embodiment of the invention, the density of the high density brine is at least about 11 lb/gal (1.3 kg/l). The salt in the water to make the brine may be a chloride, bromide, formate or acetate salt. The salt cations may be lithium, sodium, potassium, calcium, zinc, ammonium, cesium, and rare earths. Mixtures of salts may also be employed. In one non-limiting embodiment, zinc sources are preferred, and zinc chloride and zinc bromide are particularly preferred zinc sources. Rare earths have their common definition of one or more of a group of 14 chemically related elements in row 6 of the Periodic Table ranging from lanthanum to ytterbium, inclusive. In one non-limiting embodiment of the invention, the brine may include up to 35 wt. % potassium formate, preferably from 0.1 to 30 wt. %.

The additive may be an amine or ammonia or mixtures thereof, or base releasing compound, e.g. a compound which can generate amine or ammonia, where the additive is present in an amount effective to raise the pH of and increase the corrosion inhibition of a brine. Generally, the additive may be any neutralizing compound containing amine functionality, or capable of releasing a neutralizing compound. While not wishing to be limited to a particular mechanism or explanation of how the invention operates, the amine may be understood as one which is capable of absorbing some of the acid. As non-limiting examples, the additive may include, but is not limited to ammonia, alkyl, aryl or alkylaryl amines of the formula $R^1R^2R^3N$, where $R^1$, $R^2$, and $R^3$ are independently selected from the group consisting of hydrogen, or hydrocarbon radical or substituted hydrocarbon radical, where the substituent is selected from the group consisting of oxygen, sulfur, nitrogen, halogen and mixtures thereof. It is to be understood that any non-interfering substituent may be placed on the hydrocarbon radical. Substituents such as halides are not reactive in the system and may also be included. In one embodiment, $R^1$, $R^2$, and $R^3$ are independently selected from the group consisting of hydrogen, or alkyl, aryl, alkylaryl or alkyl, aryl, alkylaryl groups having hydroxyl substituents. The alkyl, aryl, or alkylaryl groups may have from 1 to 12 carbon atoms. In another non-limiting embodiment, the sum of the total carbon atoms of $R^1$, $R^2$, and $R^3$, if present, is 20 or less, preferably 10 or less, and in another preferred embodiment is 6 or less. Amines which are suitable include, but are not necessarily limited to, methylamine, ethylamine, dimethylamine, trimethylamine, ethylmethylamine, ethyldimethylamine, ethylenediamine, aniline, and the like.

In a preferred embodiment, the additive should have sufficient vapor pressure to permit its incorporation into the brine by passing the additive vapor over the brine. Thus, if the carbon number of the additive, i.e., the molecular weight of the additive, is too high, it will not readily be present as a vapor. In another embodiment, ammonia is a preferred additive, for example in its anhydrous form. Anhydrous ammonia is economical and by passing its vapor over the brine, its addition may be controlled to prevent precipitation. Ammonia has high solubility in heavy brine; and it causes minimal reduction in brine density. Ethanolamines serve to lower pH and inhibit corrosion, but are less desirable because they cause a reduction in brine density. For example, the addition of, for example, triethanolamine to 17.0 ppg (2.04 kg/l) $ZnBr_2$—$CaBr_2$ brine yields a brine of relatively higher pH, but of lower density.

As noted, compounds capable of releasing or generating a neutralizing compound, such as ammonia, an amine, or a salt thereof, are suitable additives as well. Such compounds may be liquids or solids which release the base relatively slowly. Examples of such compounds include, but are not limited to, hydroxylamine, hydrazine, amides, azoles, piperidines, piperizines, aziridines, azides, betaines, amino acids, ureas, guanidines, and salts thereof, in short any compound that can release or generate ammonia, an amine, or a salt thereof that can neutralize acid.

The difficulty of incorporating the additive in liquid form involves a high localized concentration of the additive which causes precipitates which do not readily redissolve into the brine. If the liquid is diluted sufficiently to prevent precipitation, then the brine is dilute enough to cause undesired reduction in brine density. Thus, it is preferred to incorporate the additive in vapor form or in some other form or by some other technique that would make the introduction gradual without high local concentrations, and without reducing brine density. While not wishing to be limited to any one theory, in one non-limiting embodiment, the precipitates are presumed to contain the cations, such as zinc e.g., but this is uncertain.

Also in a preferred, but non-limiting embodiment, the additive is present in a concentration ranging from about 0.05 moles additive per mole of cation (e.g. $Zn^{++}$) to about 2.0 moles additive per mole of cation, preferably from about 0.05 moles additive per mole of cation to about 1.5 moles additive per mole of cation. These ranges may be different for cations other than $Zn^{++}$. Too much of any additive, such as ammonia, causes a precipitate, which is undesirable. As noted, a preferred method of incorporating the ammonia or amine into the brine is to pass vapor containing the additive over the brine solution. In this way, the incorporation of the additive can be done in a controlled manner. Other ways of contacting the brine with the additive which is in the vapor phase can be devised. For instance, the additive-containing vapor can be bubbled up through the brine, or the brine could be sprayed into a vessel containing the vaporized additive. In some instances, an inert gas may be part of the vapor used to contact the brine.

The greater the amount of ammonia (or amine, or salt thereof) added to the brine, the better the corrosion properties of the brine will be. However, increasing proportions of ammonia or amine tends to decrease the stability of the brine. In some instances, as the concentration of ammonia approaches 1% w/w, the solution may begin to precipitate. The degree of precipitation is directly proportional to the amount of ammonia added. This precipitation results in loss of density, which reduces its utility.

It has been additionally discovered that blending complexing agents in the brine before ammonia or amine treatment will suppress the precipitation of salts. By this mechanism increased amounts of ammonia may be added to the brine (e.g. zinc) system further reducing acidity without concomitant loss in density.

The complexing agents are substituted carboxylic acids. The substituted carboxylic acids may include diacids and triacids as well. In a preferred embodiment, the complexing agents are hydroxy carboxylic acids, and specific examples include, but are not limited to, tartaric acid, citric acid, gluconic acid, N-(2-hydroxyethyl)ethylenediaminetriacetic acid (HEDTA), and salts thereof. It is expected that any hydroxy acid which does not adversely affect the high density characteristics or corrosion characteristics of the brine would be suitable. More specifically, the hydroxy acid should have at least one hydroxyl group and at least one carboxylic acid group. The substituted carboxylic acid may be substituted with amine groups, keto groups, aldehyde groups, and mixtures thereof, and the like. In one embodiment, the hydroxy add has 8 carbon atoms or less, preferably 6 carbon atoms or less.

The amount of hydroxy acid relative to the amount of ammonia, amine, or salt thereof present ranges from about 1:100 to about 100:1 on a molar basis.

The lower acidity achieved by the invention may result from simple acid-base neutralization, or may possibly arise from ammonia forming complexes with zinc suppressing the hydrolysis of the complexed water molecules. However, it will be understood that the invention is not limited to any particular explanation of the mechanism by which it might work.

The method and additives of this invention are useful to inhibit the corrosion of iron-based metals and alloys such as steels. The additives and methods of the present invention would also be expected to be effective in inhibiting the corrosion of low alloy steels, carbon steels, stainless steels, nickel-based alloys, and the like. The corrosion of copper alloys may also be inhibited by the compositions and methods of this invention, but there is a possibility that the nitrogen-containing materials may cause stress cracking in copper alloys.

Using the compositions and methods of this invention, corrosion rates with N-80 steel may be reduced by two orders of magnitude and more in comparison with corrosion rates in conventional zinc-based brine of the same density, it is further expected that the thermal stability of viscosifiers in zinc-brine-based brines should be enhanced significantly. Conventional viscosifiers include, for example, polysacchandes. Low pH brines react with the polysaccharide by acid hydrolysis of the polymer linkages, which thus reduces the viscosity and stability of the fluid.

Optionally, one or more conventional corrosion inhibitors may be used in the brines of this invention to further improve their corrosion properties. In another embodiment of the invention, the additives are used in the absence of other, added corrosion inhibitors. In another embodiment of the invention, the additives are used in the absence of an added Group VB metal (previous IUPAC notation), and particularly in the absence of added arsenic.

The invention is further illustrated by the following Examples, which are only meant to illuminate the invention and not limit it in any way.

EXAMPLES 1–4

Zinc and calcium bromide brine solutions of varying ammonia contents were prepared. The starting density of the solutions was 19.2 lb/gal (2.3 kg/l). These solutions were prepared by passing ammonia gas over the surface of the high density brines. The resultant solutions were tested at 350° F. (177° C.) for 64 hours on N-80 tubing steel, and the results are presented in Table I. Example 1 is the comparative control incorporating no ammonia. pH values were obtained in 1 to 100 distilled water diluted solutions.

TABLE I

Raising pH and Corrosion Resistance using Ammonia

| Ex. | $pH^1$ | ratio $[NH_3]/[Zn^{++}]$ | % $NH_3^2$ | Density #/gal, after | Density kg/l, after | Corrosion Losses, $lb/ft^2$ | Corrosion Losses, $kg/m^2$ |
|---|---|---|---|---|---|---|---|
| 1 | 5.5 | — | none | 19.2 | 2.30 | 0.054 | 0.264 |
| 2 | 6.8 | 0.54 | 2.15 | $17.9^3$ | 2.14 | 0.001 | 0.005 |
| 3 | 6.7 | 0.33 | 1.34 | 19.0 | 2.28 | 0.002 | 0.010 |
| 4 | 6.2 | 0.14 | 0.55 | 19.2 | 2.30 | 0.007 | 0.034 |

[1] The pH values of the brines were obtained in distilled water: composition is 1 ml of brine and 99 ml DI water.
[2] Ammonia concentrations were determined by weight difference from the ammonia cylinder.
[3] 92 grams of zinc oxide were recovered when the mixture cooled. The collected precipitate accounts for the loss of density.

Examples 2 and 3, incorporating 0.54 moles ammonia per mole of zinc ion and 0.33 moles ammonia per mole of zinc ion respectively, demonstrate increased pH at 6.8 and 6.7, respectively, over 5.5 for comparative Example 1 using no ammonia, and greatly improved corrosion resistance, having 0.001 and 0.002 lbs/ft² (0.005 and 0.010 kg/m²) respectively, over 0.054 lbs/ft² (0.264 kg/m²) for comparative Example 1.

EXAMPLES 5–16

The addition of small amounts of hydroxy acids are shown to suppress or prevent precipitation in ammonia-treated brines in accordance with this invention. Results are shown in Table II. The complexing agents were added in the amounts shown to the brine, which was then treated with ammonia vapor.

TABLE II

Increasing Ammonia Content Using Hydroxy Carboxylic Acids

| Ex. | Ammonia concentration in brine, % w/w | Complexing agent | Complexing agent, amount | Comments |
|---|---|---|---|---|
| 5 | 2.08 | tartaric acid | 0.16% | slight precipitate in 24 hours |
| 6 | 0.99 | tartaric acid | 0.16% | no precipitate |
| 7 | 0.78 | tartaric acid | 0.16% | no precipitate |
| 8 | 1.38 | citric acid | 0.30% | no precipitate |
| 9 | 0.89 | citric acid | 0.30% | no precipitate |
| 10 | 0.78 | citric acid | 0.30% | very slight precipitate in 24 hours |
| 11 | 1.68 | sodium gluconate | 0.28% | very slight precipitate |
| 12 | 1.56 | sodium gluconate | 0.28% | no precipitate |
| 13 | 0.78 | sorbitol | 0.23% | precipitate in 24 hours |
| 14 | 1.00 | HEDTA | 0.20% | precipitate in 96 hours |
| 15 | 0.8 | none | | precipitate in 16 hours |
| 16 | 2.0 | none | | precipitate in 4 hours |

It may be seen that the hydroxy acid HEDTA was not an effective complexing agent for this system at the concentration added (Example 14). Also, sorbitol, which has six carbon atoms and six hydroxyl groups but no carboxylic acid functionality, was ineffective in Example 13 at preventing precipitation.

In the foregoing specification, the invention has been described with reference to specific embodiments thereof, and has been demonstrated as effective in providing brine fluids having increased pH and corrosion resistance with little decrease in density. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, specifically salts and additives, in other proportions or added in different ways, falling within the claimed parameters, but not specifically identified or tried in a particular composition to improve the brines herein, are anticipated to be within the scope of this invention.

I claim:
1. A corrosion resistant brine fluid comprising:
   water;
   a source of water soluble cations where the cations are selected from the group consisting of sodium, calcium, zinc, ammonium, rare earths, and mixtures thereof to form a brine with the water; and
   an additive present in a concentration ranging from about 0.05 to about 2.0 moles of additive per mole of cation, in the absence of added arsenic;
   where the density of the brine is at least 11 pounds/gal (1.3 kg/l), and where the additive is selected from the group consisting of ammonia, hydrazine, azoles, piperidines, piperizines, azindines, azides, betaines, amino acids, guanidines, salts of hydrazine, azoles, piperidines, piperizines, aziridines, azides, betaines, amino acids, ureas, guanidines, thereof, and mixtures thereof.
2. The corrosion resistant brine fluid of claim 1 where the source of water soluble cations is a salt selected from the group consisting of chloride, bromide, acetate, and formate salts.

3. The corrosion resistant brine fluid of claim 1 where the source of water soluble cations is a source of water soluble zinc cations.

4. The corrosion resistant brine fluid of claim 3 where the source of water soluble zinc cations is selected from the group consisting of zinc chloride and zinc bromide.

5. The corrosion resistant brine fluid of claim 1 further comprising at least one additional corrosion inhibitor.

6. The corrosion resistant brine fluid of claim 1 further comprising at least one hydroxy carboxylic acid complexing agent.

7. A method for increasing the corrosion resistance of a brine fluid comprising:
   providing a brine comprising;
   water;
   a source of water solublezinc cations to form a brine with the water; and
   adding an additive to a concentration ranging from about 0.05 to about 2.0 moles of additive per mole of cation, in the absence of added arsenic;
   where the density of the brine is at least 11 pounds/gal (1.3 kg/l), and where the additive is selected from the group consisting of ammonia, hydrazine, piperidines, piperizines, aziridines, azides, betaines, amino acids, guanidines, salts of hydrazine, piperidines, piperizines, aziridines, azides, betaines, amino acids, guanidines, and mixtures thereof.

8. The method of claim 7 where in providing the brine the source of water soluble anions is a salt selected from the group consisting of chloride, bromide, acetate, and formate and mixtures thereof.

9. The method of claim 8 where in the brine the source of water soluble zinc cations is selected from the group consisting of zinc chloride and zinc bromide.

10. The method of claim 7 further comprising adding at least one additional corrosion inhibitor.

11. The method of claim 7 where in adding the additive, the additive is added in a controlled manner by contacting the brine with the additive in a vapor.

12. The method of claim 7 further comprising adding at least one hydroxy carboxylic acid complexing agent.

* * * * *

UNITED STATES PATENT AND TRADEMARK OFFICE
CERTIFICATE OF CORRECTION

PATENT NO. : 6,939,483 B2
DATED : September 6, 2005
INVENTOR(S) : Michael L. Walker It is certified that error appears in the above-identified patent and that said Letters Patent is hereby corrected as shown below:

Column 6,
Line 59, delete "azindines" and insert -- aziridines --.

Signed and Sealed this

Twenty-ninth Day of November, 2005

JON W. DUDAS
*Director of the United States Patent and Trademark Office*